US010757459B2

(12) United States Patent
Easley et al.

(10) Patent No.: US 10,757,459 B2
(45) Date of Patent: Aug. 25, 2020

(54) VIDEO STEAMING CONTROL

(71) Applicant: AT&T Intellectual Property I, L.P., Atlanta, GA (US)

(72) Inventors: Mark Easley, Coweta, OK (US); Vivek Mhatre, Bellevue, WA (US); Thomas A. Cannon, Jr., Lynnwood, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/214,723

(22) Filed: Dec. 10, 2018

(65) Prior Publication Data
US 2020/0186857 A1   Jun. 11, 2020

(51) Int. Cl.
| H04N 21/441 | (2011.01) |
| H04N 21/2665 | (2011.01) |
| H04N 21/258 | (2011.01) |
| H04N 21/436 | (2011.01) |
| H04N 21/488 | (2011.01) |
| H04N 21/431 | (2011.01) |
| H04N 21/41 | (2011.01) |

(52) U.S. Cl.
CPC ... *H04N 21/2665* (2013.01); *H04N 21/25816* (2013.01); *H04N 21/25841* (2013.01); *H04N 21/25866* (2013.01); *H04N 21/4122* (2013.01); *H04N 21/436* (2013.01); *H04N 21/4316* (2013.01); *H04N 21/4886* (2013.01); *H04N 21/441* (2013.01)

(58) Field of Classification Search
CPC .................................................. H04N 21/441
See application file for complete search history.

(56) References Cited

U.S. PATENT DOCUMENTS

| 8,544,724 B2 | 10/2013 | Gilbert et al. |
| 8,863,185 B2 | 10/2014 | Stinson et al. |

(Continued)

FOREIGN PATENT DOCUMENTS

KR   20150122107 A   10/2015

OTHER PUBLICATIONS

Bouten, et al., "An Autonomic Delivery Framework for HTTP Adaptive Streaming in Multicast-enabled Multimedia Access Networks", 2012, 6 pages.

(Continued)

*Primary Examiner* — Michael H Hong
(74) *Attorney, Agent, or Firm* — Guntin & Gust, PLC; John G. Rauch

(57) ABSTRACT

Aspects of the subject disclosure may include, for example, a media server having a processing system including a processor; and a memory that stores executable instructions that, when executed by the processing system, facilitate sending a datastream to a display device. The datastream may include an identification thereof. Upon receiving the identification from a user, the media server associates the datastream with the user. The media server may send to the user, a listing of the media services to which the user has subscribed. Upon receiving, from the user, a selection of a selected media service, the media server streams the selected media service to the display device over the datastream. The datastream may be controlled with the user for as long as the media server detects the user in a vicinity of the display device. Other embodiments are disclosed.

20 Claims, 9 Drawing Sheets

(56) References Cited

U.S. PATENT DOCUMENTS

| | | |
|---|---|---|
| 8,938,763 B2 | 1/2015 | Hasek |
| 9,107,055 B2 | 8/2015 | Zerr et al. |
| 9,143,565 B2 | 9/2015 | Hensgen et al. |
| 9,319,725 B2 | 4/2016 | Panigrahi |
| 9,363,539 B2 | 6/2016 | Das |
| 9,398,338 B2 | 7/2016 | Hjelmstedt et al. |
| 9,736,541 B1 | 8/2017 | Nijim et al. |
| 9,740,375 B2 | 8/2017 | Kruglick |
| 9,813,759 B2 | 11/2017 | Klein et al. |
| 9,942,602 B2 | 4/2018 | Petrovic et al. |
| 10,028,005 B2 | 7/2018 | Archibong et al. |
| 10,045,090 B2 | 8/2018 | Kareeson et al. |
| 2002/0053081 A1* | 5/2002 | Griggs ............... H04N 5/44543 725/39 |
| 2011/0091184 A1* | 4/2011 | Sasaki .................... H04S 7/303 386/230 |
| 2014/0051408 A1 | 2/2014 | Jenzowsky et al. |
| 2014/0325561 A1 | 10/2014 | Allen et al. |
| 2016/0219319 A1 | 7/2016 | Servignat et al. |
| 2017/0094345 A1 | 3/2017 | Zerr et al. |
| 2018/0098181 A1 | 4/2018 | Zerr et al. |
| 2018/0349708 A1* | 12/2018 | van Hoof ......... G08B 13/19656 |

OTHER PUBLICATIONS

Bruneau-Queyreix, Joachim et al., "A multiple-source adaptive streaming solution enhancing consumer's perceived quality", 2017, 3 pages.

Vutyme, https://web.archive.org/web/20170808163200/https://www,adbglobal.com/solutions/business-tv/vutyme/, Aug. 8, 2017, 6 pages.

\* cited by examiner

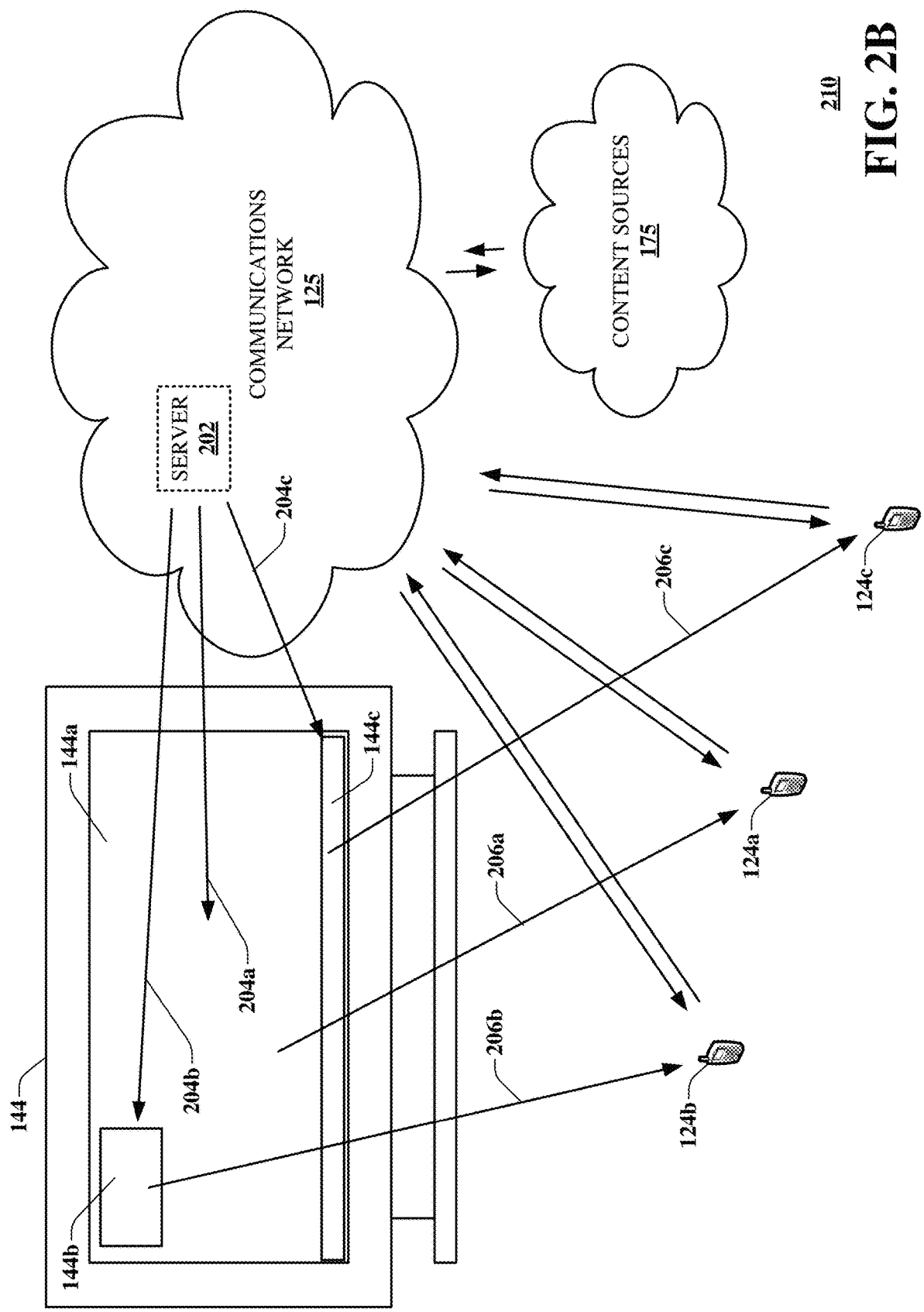

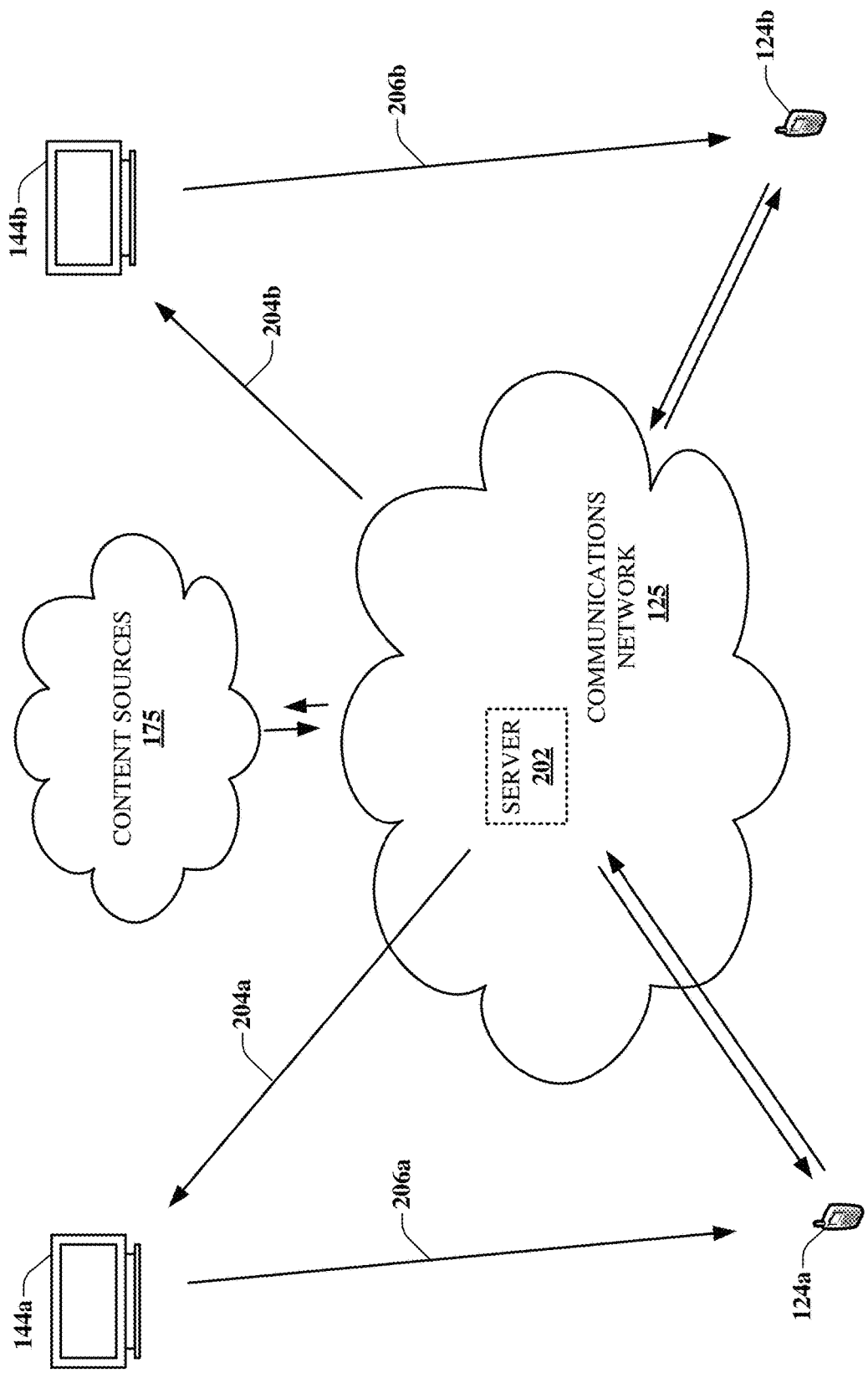

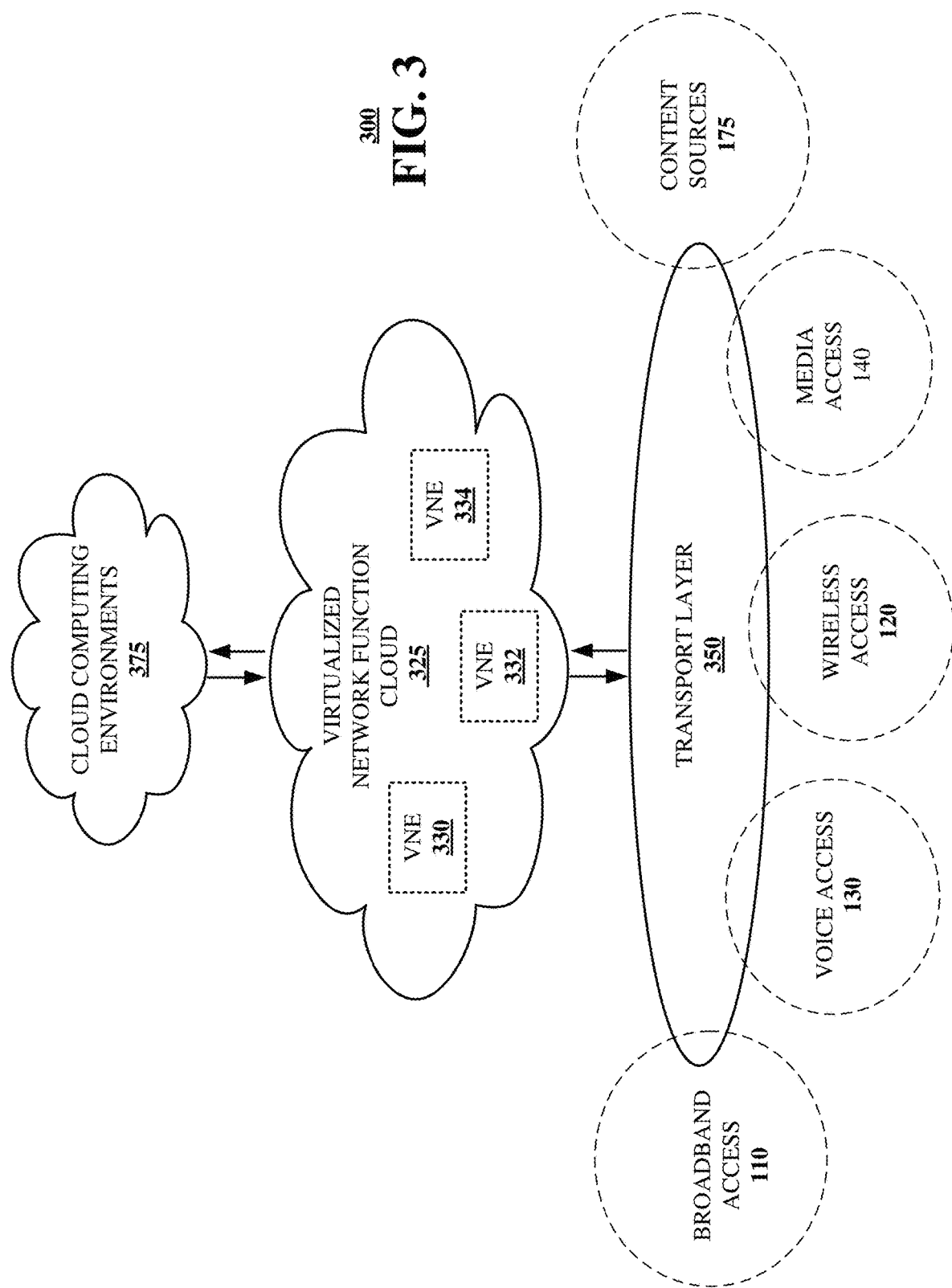

VIDEO STEAMING CONTROL

FIELD OF THE DISCLOSURE

The subject disclosure relates to video streaming control.

BACKGROUND

TVs and other displays are ubiquitous. For example, hotels, bars, theaters, and other places have TVs or other screens. Often, those screens are connected to media systems, which may not be accessible to users.

BRIEF DESCRIPTION OF THE DRAWINGS

Reference will now be made to the accompanying drawings, which are not necessarily drawn to scale, and wherein:

FIG. 2B is a block diagram illustrating another example, non-limiting embodiment of a system functioning within the communication network of FIG. 1 in accordance with various aspects described herein.

FIG. 2C is a block diagram illustrating still another example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
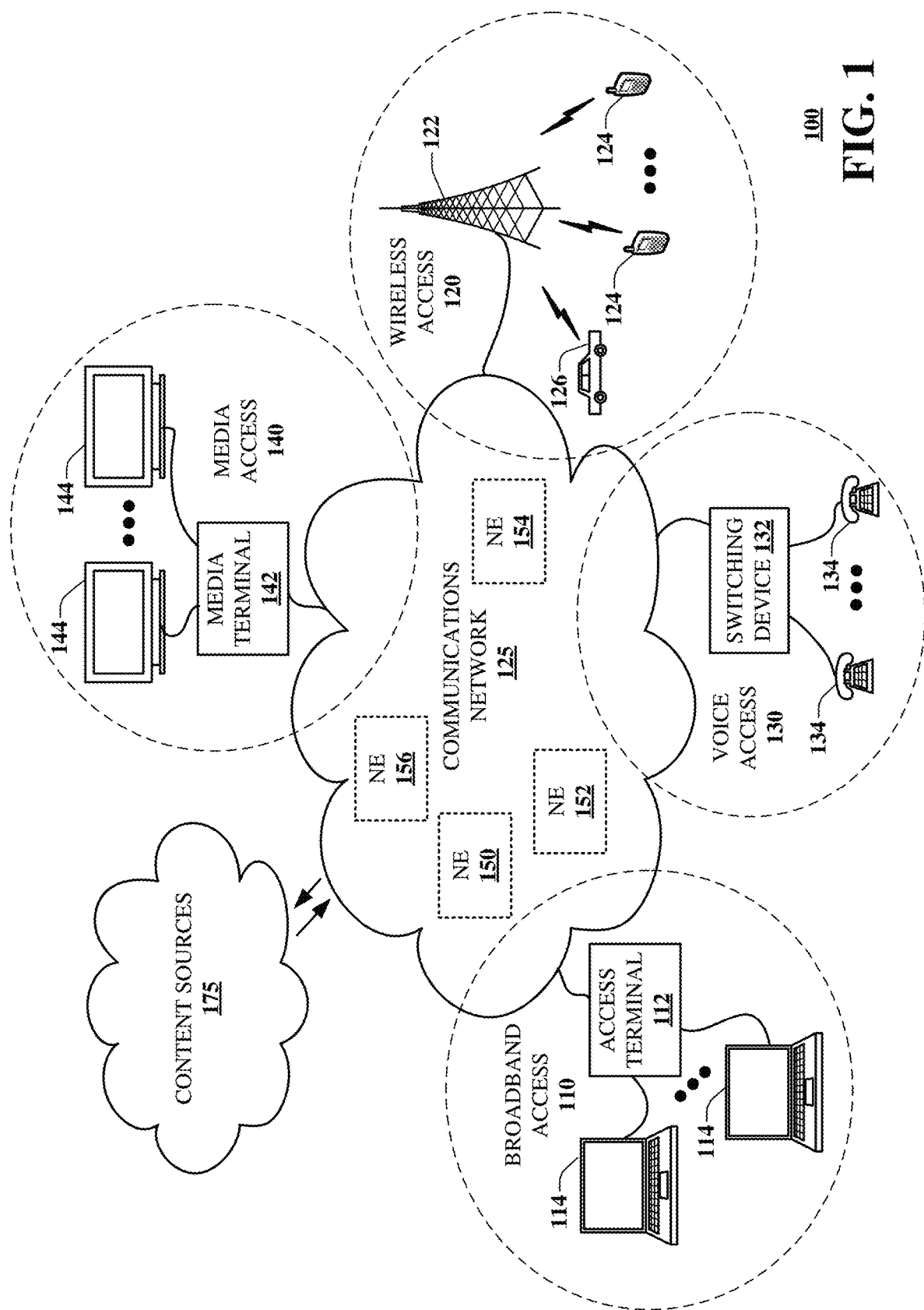
FIG. 1 is a block diagram illustrating an exemplary, non-limiting embodiment of a communications network in accordance with various aspects described herein.

The subject disclosure describes, among other things, illustrative embodiments for controlling video streaming to a display. Other embodiments are described in the subject disclosure.

One or more aspects of the subject disclosure include a media server having a processing system including a processor; and a memory that stores executable instructions that, when executed by the processing system, facilitate sending a datastream to a display device. The datastream may include a first sub-stream and/or an identification that identifies the datastream and/or first sub-stream. Upon receiving, from equipment of a first user, the identification, the media server associates the datastream or first sub-stream with the first user. The media server then accesses account information of the first user, which may list media services to which the first user has subscribed. The media server may send to the equipment of the first user, a listing of the media services to which the first user has subscribed. The listing may include fewer than all of the media services to which the first user has subscribed based on a location of the display device.

Upon receiving, from the equipment of the first user, a selection of a selected media service, the media server streams the selected media service to the display device over the datastream or first sub-stream. Associating the first sub-stream with the first user may be performed without the media server receiving a signal from the first display device. The first sub-stream may be associated with the first user for as long as the media server detects the first user in a vicinity of the display device. The media server may automatically revert the first sub-stream a default content when the media server detects that the first user has left the vicinity of the first display device.

The media server may control multiple displays and thus also send a second datastream to a second display device, the second datastream including a second identification that specifically identifies the second datastream. In some cases, the first datastream may be identical to the second datastream except that the first identification is different than the second identification. The identification(s) may be embedded within the datastream and/or sub-stream(s) and/or displayed simultaneously with media content on the display device.

The datastream may include a second sub-stream and a second identification that identifies the first datastream and the second sub-stream. For example, the first sub-stream may correspond to a main screen of the display device and the second sub-stream may correspond to a sub-screen of the display device, such as a ticker along an edge of the display device or a picture-in-picture overlaying the main screen of the display device. A second user may control the second sub-stream independently of the first sub-stream, such that both the first user and the second user simultaneously control content displayed on the display device.

One or more aspects of the subject disclosure include a method comprising capturing, by a processing system having a processor, a first identification of a first datastream being displayed on a display device; sending, by the processing system, the first identification to a media server in communication with the display device; receiving, by the processing system from the media server, a listing of media services to which a user of the processing system has subscribed, the listing being based on a location of the display device; sending, by the processing system to the media server, a selection of a selected media service from listing, wherein receipt of the selection at the media server causes the media server to stream the selected media service on the first datastream to the display device; and controlling, by the processing system, the first datastream. The controlling of the first datastream, may be performed through communication between the processing system and the media server without communication between the processing system and the display device. The controlling of the first datastream by the processing system may cease when the media server detects that the processing system passes beyond a distance threshold from the location of the display device.

One or more aspects of the subject disclosure include a computer-readable storage medium, comprising computer instructions, which, responsive to being executed by a processor, cause the processor to perform operations comprising sending a datastream to a display device, the datastream including both a first sub-stream and a first identification that identifies the datastream; responsive to receiving, from equipment of a first user, the first identification, determining a location of the display device and associating the first sub-stream with the first user; accessing first account information of the first user, wherein the first account information lists media services to which the first user has subscribed; sending to the equipment of the first user, a listing of the media services to which the first user has subscribed, wherein the listing is based on a location of the display device; responsive to receiving, from the equipment of the first user, a selection of a selected media service, streaming the selected media service to the display device over the first sub-stream; monitoring a location of the equipment of the first user; and controlling the first sub-stream according to input received from the equipment of the first user while the equipment of the first user remains within a distance threshold of the location of the display device. The datastream may include a second sub-stream and a second identification that identifies the datastream and the second sub-stream. A second user may control the second sub-stream independently of the first sub-stream, such that both the first user and the second user simultaneously control content displayed on the display device. The identification(s) may further identify the sub-stream(s) and/or may be embedded within the sub-stream (s).

Referring now to FIG. 1, a block diagram is shown illustrating an example, non-limiting embodiment of a communications network 100 in accordance with various aspects described herein. For example, communications network 100 can facilitate in whole or in part video streaming control as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
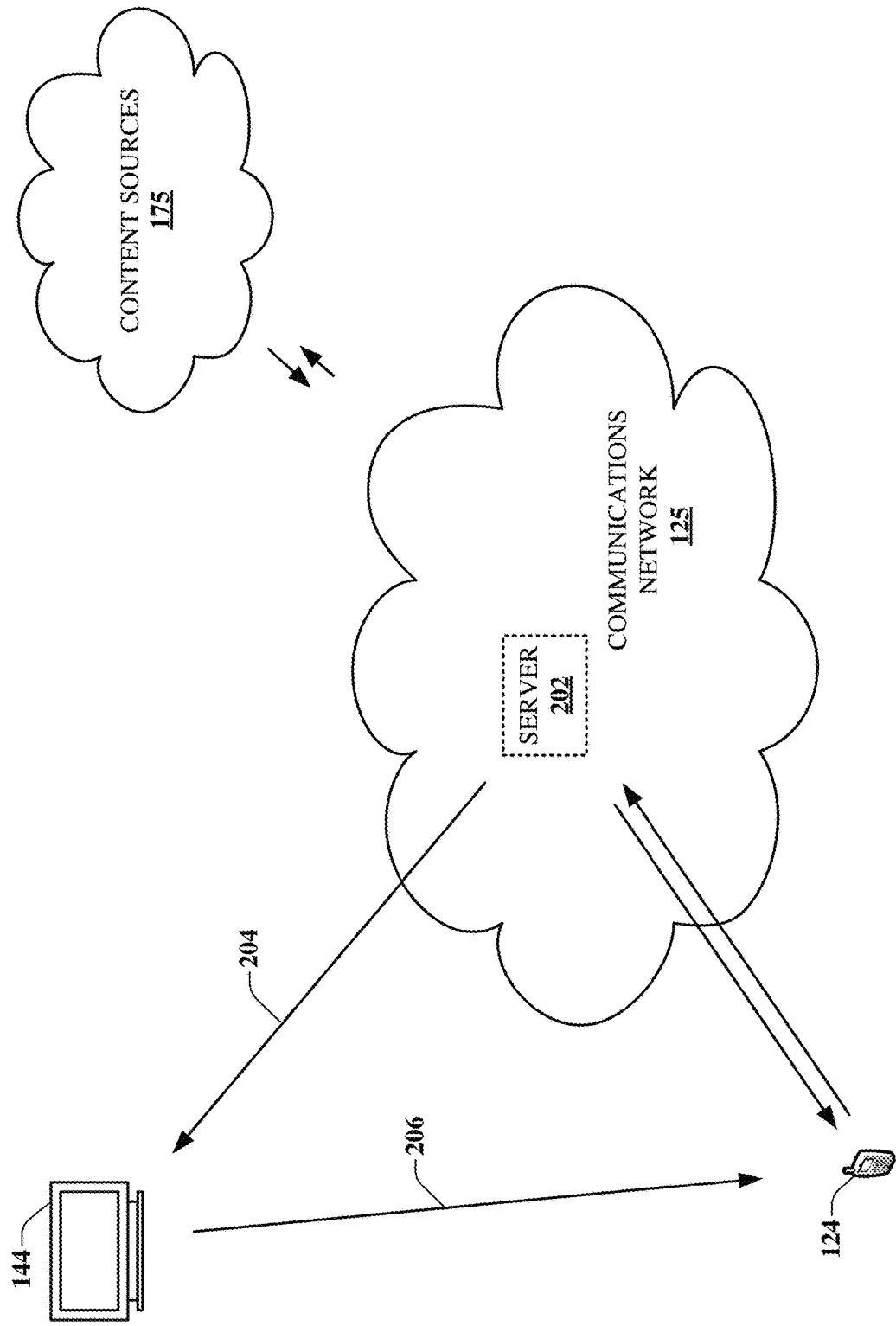
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. As shown, the system 200 allows a user to essentially capture control of a TV or other display 144, and use it to stream whatever they want, possibly chosen from services to which they subscribe, regardless of who owns the display or where it is. This is different from existing systems where a user may send a stream from their phone/laptop to their own trusted TV, which may be on the same Wifi connection, etc.

The TV/display 144 may present an imperceptible watermark or audio signal that is provided by a media server 202. The watermark/signal may be embedded in the datastream 204 from the media server 202 and is unique to the specific TV/display 144 and/or datastream 204. The user captures the watermark with their device 124, which may be done using an application. The media server 202 then changes the datastream 204 to that display 144 to something customizable to/by the user and controllable from their device 124, without the need for a special device, connection, or App on the TV. In one embodiment, this is done on a dedicated channel, instead of embedded into every channel.

When a user captures control of a display 144, they can choose what to display from any of their Netflix, Amazon, Hulu, or other media accounts. The media server 202 thus becomes a media center/aggregator. For example, some existing devices can be physically plugged into a TV, signed onto a local WiFi signal, and then they allow a user to access their Netflix, Amazon, etc., but the user needs to carry that device and have access to a local WiFi signal. In some embodiments, the exemplary device and methodology eliminates the need to carry any additional devices merely to provide such functionality, by having the media server 202 instantiate a virtual machine acting as media center/aggregator.

In some embodiments, any or all of the user's media subscriptions may be consolidated at/by the media server 202 via a virtual machine/container/software component (vMC). For example, the user may authenticate this vMC with Netflix/Amazon using their respective account credentials. Then, a given content can be streamed from the Netflix/Amazon server to this vMC/media server 202. The media server/vMC 202 can then act as a relay, and the user's media content can then be displayed on one or more acquired datastream 204, or sub-stream, as described herein.

In at least one embodiment, a media server 202 provides a datastream 204 to a display 144. The datastream 204 includes an identification 206 thereof. In at least one embodiment, the identification 206 is embedded within media content in the datastream 204 by the media server 202. For example, a channel logo that is displayed simultaneously with and often overlaid on the media content, may include a visible or invisible code, such as a QR or other barcode. In some embodiments, the identification 206 is embedded within the media content intermittently, such as in a single frame, displayed periodically, that would be imperceptible to the human eye. In many embodiments, the identification 206 is embedded within the media content without requiring the user to request it in any way. Again, this is different than existing systems in which a code is only displayed on demand.

In any case, the user captures the identification 206 from the display 144. For example, the user may utilize user equipment (UE), such as a laptop or other data terminal 114 via access terminal 112 or a smartphone, tablet or other mobile device 124. More specifically, in one embodiment, the user aims a camera of their UE 124 at the display 144 and captures a barcode identification 206 embedded in the media content of the datastream 204. The UE then communicates the identification 206 to the media server 202. The media server 202 then allows the user to control the datastream 204 to the display 144.

As can be appreciated, these functions can be implemented through an application on the UE 124, which can facilitate capturing and communicating the identification 206. Such an application may also allow the user to select media content to be put on the datastream 204 to the display 144 by the media server 202. For example, in at least one embodiment, the media server 202 is in communication with the UE 124, and thereby knows who the user is, where they are, and what media services (such as Netflix, Amazon Prime, Hulu, etc.) to which the user subscribes. Upon receiving the identification 206, the media server 202 also knows which display 144 the user would like to control and where it is located, as such information may be stored in a database and/or may be detected by the media server 202. In any case, the media server 202 may provide a list of the media services to which the user subscribes to the UE 124, from which the user selects. Upon receiving the selection, the media server 202 puts that media content on the datastream 204 to be displayed on the display 144. Thereafter, the user may control the datastream 204 to the display 144, such as by changing the media content, fast forwarding, rewinding, pausing, etc. The list of the media services may be known to the application on the UE 124, such that the media server 202 does not need to send the list to the UE 124.

In at least one embodiment, the UE 124 is a source of media content, in addition to or as an alternative to the content sources 125. For example, content, such as power point presentations, video, images, and/or live streaming, on the UE 124 may be mirrored on the display 144. This may be done via the media server 202 and datastream 204, thereby requiring no direct communication from the UE 124 to the display 144.

The user may authenticate themselves and/or their UE 124 with the media server 202 using a completely network-based approach. For example, a mobile communications network, which (as used herein) includes a radio access network (RAN) and supporting core network elements (that enable mobile wireless communications), may to triangulate a location of the UE 124, and provide this location info as well as a user identity and subscription info to the media server 202. This may be done without requiring the user to enable location sharing and/or without requiring the user to enter a username/password/code, thereby rendering the described video streaming solution seamless and transparent to the user and may not require a special application and/or location sharing capability on the UE 124. In at least one embodiment, however, the user utilizes a special application on the UE 124 that authenticates the user and/or allows UE 124 location sharing within that application.

In some embodiments, the media server 202 may limit which media services may be displayed on the display 144. For example, where the display 144 is located in a sports bar, the media server 202 may be configured to limit media content displayed thereon to sports, and therefore may not include in the list movie channels to which the user subscribes. Thus location may be used to determine what the user may elect to show on the display 144. Similarly, time may also (or alternatively) be used. For example, where the display 144 is located in a public location frequented by children before 10 PM, the media server 202 may be configured to limit media content displayed thereon to G or PG rated movies before 10 PM, and therefore may include one or more movie channels to which the user subscribes, but only allow the user to select G or PG rated movies, until 10 PM. Such limits may be negotiated with whoever owns the display 144 beforehand or may be negotiated on the fly.

Use of the display 144 in the manner described herein may generate revenue, to the entity owning the media server 202, the display 144, and/or the content sources 175 who supply the media content. Such rates may be negotiated beforehand or may be negotiated on the fly.

FIG. 2B is a block diagram illustrating an example, non-limiting embodiment of a system 210 functioning within the communication network of FIG. 1 in accordance with various aspects described herein. System 210 may be similar to system 200 described above. One difference, however, is that the display 144 may include multiple sub-displays/screens, each of which may be independently controlled through their respective sub-streams. For example, a main display 144a of the display 144 may be controlled through a first sub-stream 204a having a unique identification 206a embedded therein. Additionally, a picture-in-picture display 144b of the display 144 may be controlled through a second sub-stream 204b having a unique identification 206b embedded therein. As another example, a sports or other news ticker 204c running along an edge of the display 144 may be controlled through a third sub-stream 204c having a unique identification 206c embedded therein. Each of these sub-screens 144a, 144b, 144c are fed through their respective sub-streams 204a, 204b, 204c, and may be independently identified using their unique respective identifications 206a, 206b, 206c, and therefore controlled by different users using different UE 124a, 124b, 124c. Of course, more or fewer sub-screens may be utilized and any single user may independently control one or more of the sub-screens.

FIG. 2C is a block diagram illustrating an example, non-limiting embodiment of a system 220 functioning within the communication network of FIG. 1 in accordance with various aspects described herein. System 220 may be similar to system 200 and/or system 210 described above. It can be appreciated that the media server 202 may provide multiple datastreams 204a, 204b and/or sub-streams to multiple displays 144a, 144b and/or sub-displays/screens, which may be remotely located with respect to one another and/or the media server 202. In any case, each of the displays 144a, 144b may be independently controlled by different users through their respective UE 124a, 124b.

The different owners of the different displays may offer preferences, and/or requirements/imitations, for the types of media content that they are willing to allow on their respectively displays. For example, only sports channels may be allowed in pubs/bars, while only PG-13 or lower channels/content may be allowed on displays located in public places, etc. Owners may also be compensated for such use. For example, any of the systems 200, 210, 220 may include a credit accrual/payment process or sub-system, in which the owner of a particular display gets reimbursed based on the time of day, duration, type, and/or quality (HD/4K) of content for which their display is used by another user.

Any of the systems 200, 210, 220 may include a notification sub-system in which a user looking for the "nearest" available HD display is notified of available displays and their rental rate and availability. Any of the systems 200, 210, 220 may include a preference matching mechanism in which viewers who want to use a display to view their content, have their tastes, screen size requirements, past ratings of the screen/display, and a screen owner who offers one or more screens/displays with certain attributes. Any of the systems 200, 210, 220 may include a real-time bidding sub-system for screen/display rentals based on attributes such as who is looking to rent, and for what, and for how long.

As mentioned, a QR code or other datastream identifier may be embedded in a logo of the TV channel to indicate that the display is available for use. The QR code or other datastream identifier may either disappear or redirect to "This channel in use" web portal when the display/screen is currently acquired and being used by another user. The QR code or other datastream identifier, such as a watermark, may be securely encrypted and/or embedded in the datastream so that it supports mutual authentication, i.e., when the user decodes the identifier and visits a certain URL via browser or application, the network is also authenticated by the user (in addition to the network authenticating the user). This is so that users are not misled by malicious video stream that appear legit, but actually redirect the user to malicious websites.

On displays/screens that have an embedded/attached cameras/microphones, the display may utilize the attached camera/microphone to validate the presence of the user by taking a video/picture of the user standing in front of the screen, as well as by capturing a separate QR code/code/identifier from user's mobile device for additional authentication.

Any of the systems 200, 210, 220 may capture the user location via location services in the application when the user tries to acquire the display/screen, and using this info in conjunction with location information of all the past acquisitions of the particular display to not just validate the location of the user, but also the location of the display. For example, the owner of the screen (as part of opt-in and onboarding) could do a screen capture of the screen and provide location info to pin this screen at a known location. In some embodiments, location information may come from services in an application, specifically from the network, or from a combination of the two. Upon capturing of the display, as described herein, a network-based location may be used when providing the location of the captured display.

Any of the systems 200, 210, 220 may a display being used as a portal for accessing messaging and other Web notification services. User text messages, IM, callerID, VM notification may be displayed via overlay to the display being controlled by a user. Displays be used as described herein may expose WebRTC capabilities associated with the UE. The display may then be used to display content from the WebRTC session. Displays be used as described herein may have a real-time overlay encoded on top of the media content being displayed thereon, which may allow the controlling user to draw on the display using the touch interface of their UE. The UE may share drawing capabilities with other devices by transmitting a message with a unique code/identifier that allows for control of the overlay. Using the known network location of the UE controlling a screen, the overlay and/or content stream may be customized to match location specific context, such as local attraction information, hotel maps, neighborhood traffic, etc.

A display in use may expose its overlay via an API to allow for integration with third party services. The API exposure layer allows the third party service to use the overlay to display content, such as secondary video, messaging, audio over the top of the primary datastream. Third party services may also allow sharing of a stream to friends or other users. Access to any datastream might be granted based on subscription status of any of the users. Third party API access to a datastream may allow the third party to offer sponsorship of the datastream and/or control the content thereon.

Location context, such as that gathered from the UE controlling a display, validated by the network, derived entirely from the network, and/or verified by display location, may be provided to an advertising feed for the selected media content. Advertisements may thus be targeted to the user, location context, and/or content rules.

When not being controlled as described herein the datastream may include a default content, such as regularly scheduled programming and/or a default broadcast channel. In several embodiments, the identification(s) of the datastream and/or sub-stream(s) are always embedded or otherwise included in the datastream and/or sub-stream(s). In one embodiment, the identification(s) of the datastream and/or sub-stream(s) is only embedded or otherwise included in the datastream and/or sub-stream(s) when the particular datastream or sub-stream(s) is not being controlled as described herein.

Figure 2D:
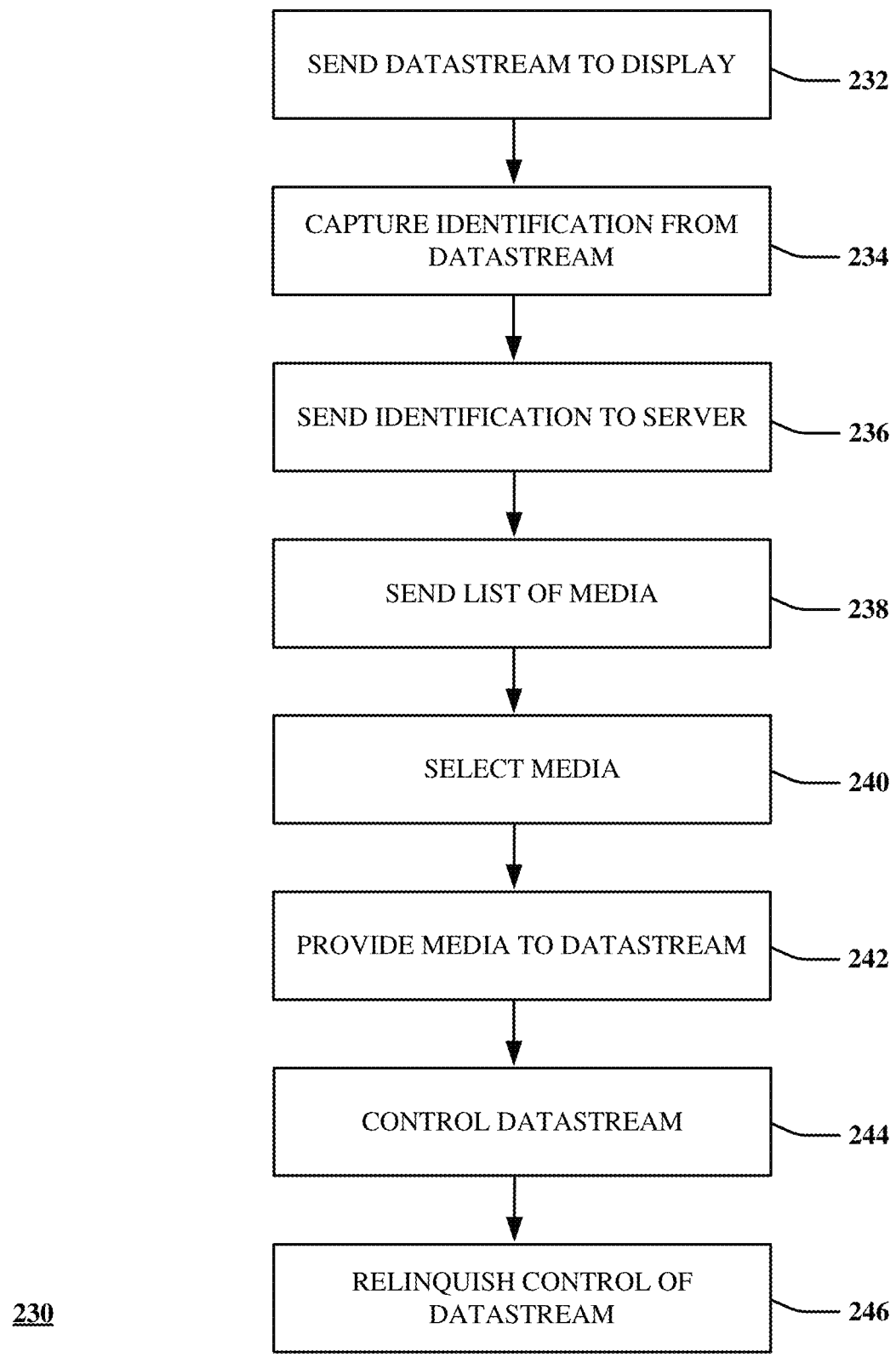
FIG. 2D depicts an illustrative embodiment of a method in accordance with various aspects described herein.

FIG. 2D depicts an illustrative embodiment of a method 230 in accordance with various aspects described herein. As discussed above, and shown in 232, a media server independently controls unique datastreams 204 and/or sub-streams to each display device 144, thereby controlling the media content sent to each display device 144. In at least one embodiment, each unique datastream 204 and/or sub-stream includes a unique identification 206, which identifies that datastream 204 and/or sub-stream.

As shown in 234, a user wishing to control a display device 144, or a portion thereof, captures the respective identification 206 from the display device 144, or a portion thereof. This may be done by taking a picture or video clip of the display device 144, or a portion thereof. The identification 206 may be embedded in the media content being displayed on the display device 144, or a portion thereof. The identification 206 may be embedded in a logo overlaid on the media content being displayed on the display device 144, or a portion thereof. The identification 206 may be periodically flashed on the display device 144, or a portion thereof, faster than the human eye can register, thereby not being apparent (or otherwise be invisible) to the user, thereby not detracting from the media content being displayed on the display device 144. As such, the identification 206 may be embedded in the datastream 204 and/or sub-stream to the display device 144 continuously, or repeatedly, without requiring the user to request it or detracting from the media content being displayed on the display device 144. In one embodiment, the identification 206 may simply be a sticker or other placard on or near the display device 144.

As shown in 234, once captured by the user's UE 124, the UE 124 sends the identification 206 to the media server 202. This may be done through an application on the UE 124. The identification 206 may include a link or otherwise identify the media server 202. In any case, by establishing, or maintaining, communication between the UE 124 and the media server 202, the media server 202 knows who the user is and where they are located. The user may need to sign into the media server 202. In at least one embodiment, however, the media server 202 maintains communication with, and authenticates, the user through their UE 124 automatically, which may be done in a similar manner as a cellular service provider now authenticates each cellular phone on their network, i.e. without the use of passwords, etc. In at least one embodiment, authentication and user identity may be seamless and thus not require any interaction on the part of the user. For example, the UE may leverage the Subscriber Identity Module (SIM) card, Universal Integrated Circuit Card (UICC), or other network authentication factors to automatically authenticate the UE 124 and/or establish the user's identity. This approach is access method independent and thus may work over any access technology, such as a mobile network and/or WiFi.

Once the UE 124 sends the identification 206 to the media server 202, the media server 202 may associate the datastream 204 and/or sub-stream to the display device 144, or portion thereof, with the user of the UE 124. This may be done without the display device 144 sending any signal or information to the media server 202 and/or without the UE 124 sending any signal or information to the display device 144.

Because the media server 202 knows who the user is, the media service 202 also knows, or can determine, which media services to which the user subscribes. For example, the media service 202 can access account information of the user, and thereby learn which media services to which the user subscribes.

One or more of the media services may be provided by or through the media server 202. In some embodiments, one or more of the media services may be provided by or through the content providers 175, in which case the media server 202 may connect the appropriate content provider 175 to the appropriate display directly or indirectly. In one embodiment, the media server 202 compiles a list of the media services to which the user subscribes and sends that list, or a portion thereof to the UE, as shown in 238. In one embodiment, an application (which may be associated with the media server 202) running on the UE 124 may know which media services to which the user subscribes and may thus not need the media server 202 to actually send the full list.

In at least one embodiment, media server 202 may be configured to limit media content displayed on each display device 144. This may be done based on time and/or location. In such cases, the list of media services may not be complete, as it may only include media services and/or specific media items, which are deemed appropriate for the particular display device 144, based on time and/or location. Where the UE 124 knows which media services to which the user subscribes, the media server 202 may only identify which media services and/or specific media items that are deemed appropriate for the particular display device 144, based on time and/or location.

As shown in 240, the user then selects which media services and/or specific media items they wish to display on the specific display device 144, or portion thereof. As shown in 242, upon receiving the selection, the media server 202 controls the datastream 204 and/or sub-stream to the display device 144 to provide the selected media to the display device 144, or a portion thereof. The media server 202 may allow the user to continue to control the display device 144, or a portion thereof, such as by switching to another media service or item, fast forwarding, pausing, rewinding, etc., as shown in 244.

As shown in 246, the user may actively relinquish control of the display device 144, or a portion thereof by sending a command to do so to the media server 202. In some embodiments, the media server 202 tracks the user's movements through their UE 124. Thus, the media server 202 may know when the use leaves the vicinity of the display device 144 or moves beyond a predetermined, or configurable distance from the display device 144. When this occurs, the media server 202 may presume that the user is no longer watching the display device 144 and/or is otherwise disinterested in the display device 144 and may revert the display device to a default media service and/or otherwise make it available to another user.

As discussed herein, the media server 202 may allow multiple users to independently control each portion of multiple display devices 144, such that a first user may control a main portion of a particular display device 144, while a second user controls a picture-in-picture portion of that display device 144, while a third user controls a ticker along the bottom (or another) edge of that display device. This can be done of each of a plurality of display devices.

As discussed herein, the list of media services may be limited based on location and or time. In some embodiments, the list of media services may be limited based on negotiated agreements and/or may be subject to costs, which may be different for each media services and may be paid by the user to the owner of the display device 144, the media server 202, and/or the content sources 175. Such payments may be pre-negotiated, paid through the user's account, and/or paid on demand.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 210, 220, and method 230 presented in FIGS. 1, 2A, 2B, 2C, 2D, and 3. For example, virtualized communication network 300 can facilitate in whole or in part video streaming control as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
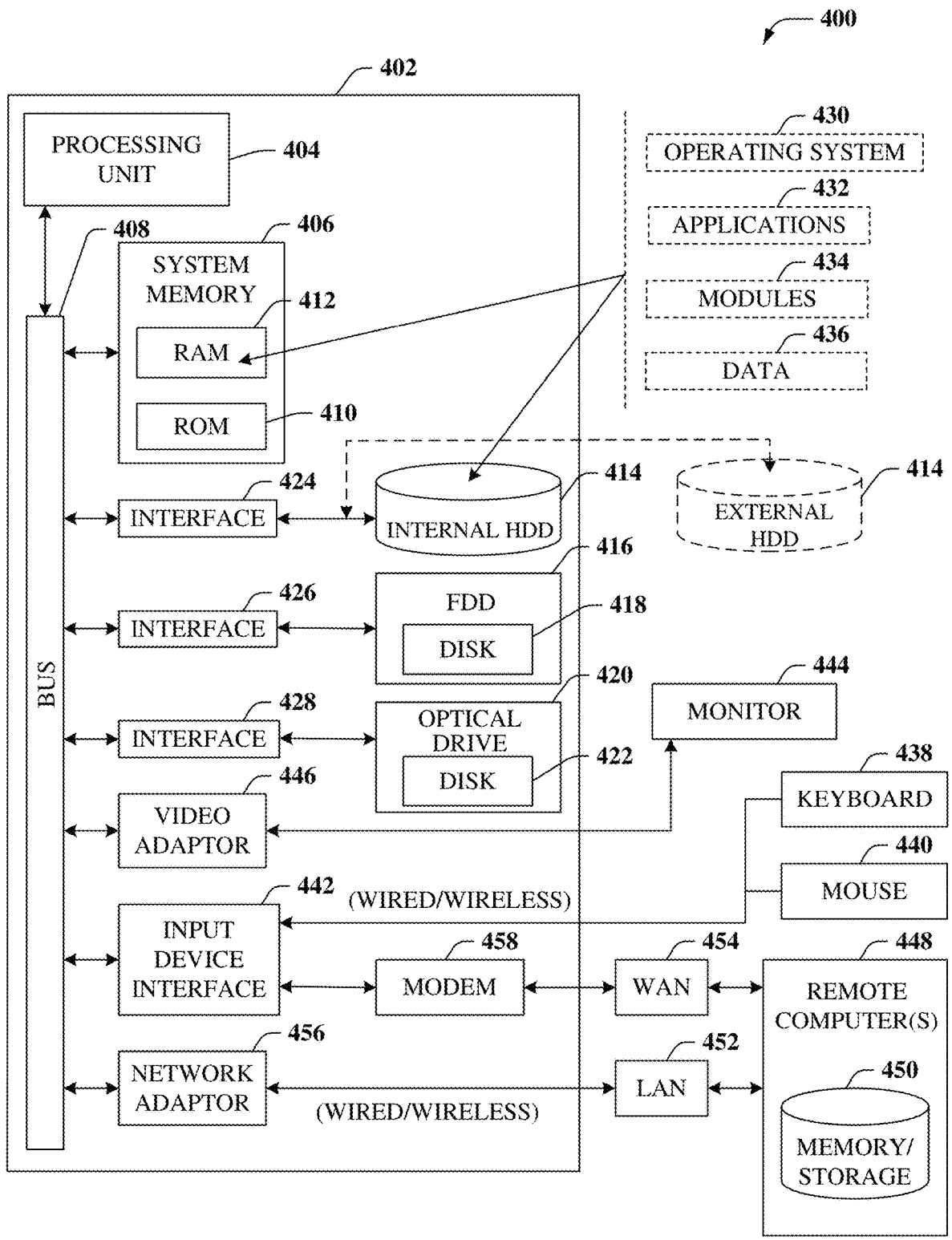
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part video streaming control as described herein.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
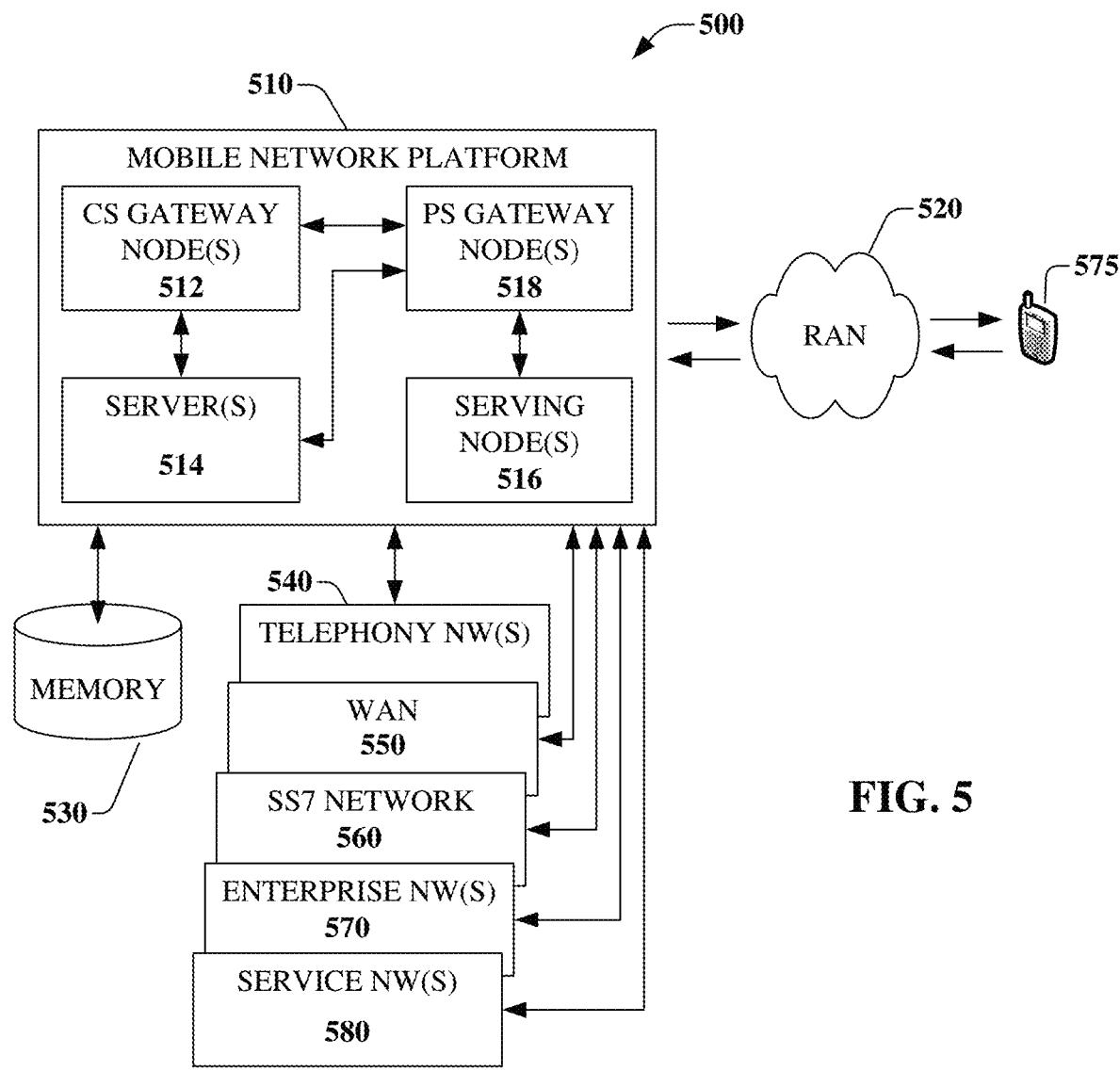
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part video streaming control as described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s)

518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antennas networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
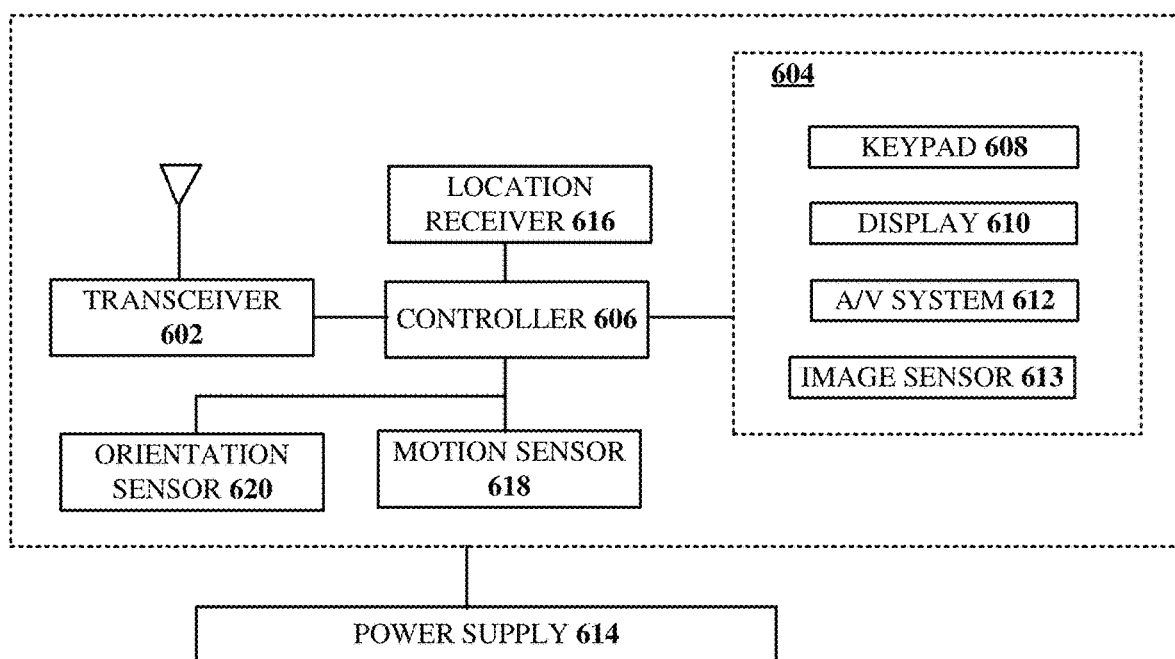
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part video streaming control as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a SIM/eSIM card or UICC. SIM or UICC cards can be used for identifying subscriber services, executing programs, storing subscriber data, and so on. A SIM/eSIM can may be a defining element of the UE 124 as an alternative to/or in cooperation with the UICC.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A media server comprising:
a processing system including a processor; and
a memory that stores executable instructions that, when executed by the processing system, facilitate performance of operations, the operations comprising:
sending a first datastream to a first display device, the first datastream including both a first sub-stream and a first identification that identifies the first datastream and the first sub-stream;
responsive to receiving, from equipment of a first user, the first identification, associating the first sub-stream with the first user;
accessing first account information of the first user, wherein the first account information lists media services to which the first user has subscribed; and
responsive to receiving, from the equipment of the first user, a selection of a selected media service, streaming the selected media service to the first display device over the first sub-stream.

2. The media server of claim 1, wherein the associating the first sub-stream with the first user is performed without the media server receiving a signal from the first display device.

3. The media server of claim 1, wherein the first identification is embedded within the first sub-stream by the media server.

4. The media server of claim 1, the operations further comprising receiving, from a mobile communications network, an identity of the first user and a location of the equipment of the first user, wherein the identity and the location are determined by the mobile communications network, wherein the first account information is identified according to the identity.

5. The media server of claim 1, the operations further comprising sending to the equipment of the first user, a listing of the media services to which the first user has subscribed.

6. The media server of claim 1, wherein the first sub-stream is associated with the first user while the media server detects the first user in a vicinity of the first display device.

7. The media server of claim 2, the operations further comprising sending a second datastream to a second display device, the second datastream including a second identification that identifies the second datastream, wherein the first datastream is identical to the second datastream except that the first identification is different than the second identification.

8. The media server of claim 3, wherein the first datastream further includes a second sub-stream and a second identification that identifies the first datastream and the second sub-stream, wherein the second identification is embedded within the second sub-stream.

9. The media server of claim 8, wherein the first sub-stream corresponds to a main screen of the first display device and the second sub-stream corresponds to a sub-screen of the first display device.

10. The media server of claim 8, wherein a second user may control the second sub-stream independently of the first sub-stream, such that both the first user and the second user simultaneously control content displayed on the first display device.

11. The media server of claim 9, wherein the sub-screen of the first display device comprises a ticker along an edge of the first display device or a picture-in-picture overlaying the main screen of the first display device.

12. The media server of claim 5, wherein the listing includes fewer than all of the media services to which the first user has subscribed based on a location of the first display device.

13. The media server of claim 6, wherein the first sub-stream reverts to a default content when the media server detects that the first user has left the vicinity of the first display device.

14. A method comprising:
 capturing, by a processing system having a processor, a first identification of a first datastream being displayed on a display device;
 sending, by the processing system, the first identification to a media server in communication with the display device;
 receiving, by the processing system from the media server, a listing of media services to which a user of the processing system has subscribed, the listing being based on a location of the display device;
 sending, by the processing system to the media server, a selection of a selected media service from listing, wherein receipt of the selection at the media server causes the media server to stream the selected media service on the first datastream to the display device; and
 controlling, by the processing system, the first datastream.

15. The method of claim 14, wherein the controlling the first datastream is performed through communication between the processing system and the media server without communication between the processing system and the display device.

16. The method of claim 14, wherein the controlling of the first datastream by the processing system ceases when the media server detects that the processing system passes beyond a distance threshold from the location of the display device.

17. A non-transitory computer-readable storage medium, comprising computer instructions, which, responsive to being executed by a processor, cause the processor to perform operations comprising:
 sending a datastream to a display device, the datastream including both a first sub-stream and a first identification that identifies the datastream;
 responsive to receiving, from equipment of a first user, the first identification, determining a location of the display device and associating the first sub-stream with the first user;
 accessing first account information of the first user, wherein the first account information lists media services to which the first user has subscribed;
 sending to the equipment of the first user, a listing of the media services to which the first user has subscribed, wherein the listing is based on a location of the display device;
 responsive to receiving, from the equipment of the first user, a selection of a selected media service, streaming the selected media service to the display device over the first sub-stream;
 monitoring a location of the equipment of the first user; and
 controlling the first sub-stream according to input received from the equipment of the first user while the equipment of the first user remains within a distance threshold of the location of the display device.

18. The non-transitory computer-readable storage medium of claim 17, wherein the first identification further identifies the first sub-stream and is embedded within the first sub-stream.

19. The non-transitory computer-readable storage medium of claim 18, wherein the datastream further includes a second sub-stream and a second identification that identifies the datastream and the second sub-stream, wherein the second identification is embedded within the second sub-stream.

20. The non-transitory computer-readable storage medium of claim 19, wherein a second user may control the second sub-stream independently of the first sub-stream, such that both the first user and the second user simultaneously control content displayed on the display device.

\* \* \* \* \*